(12) United States Patent
Hebrard

(10) Patent No.: US 10,746,166 B2
(45) Date of Patent: Aug. 18, 2020

(54) HOUSING HAVING A CYLINDRICAL INSERT SEALED AGAINST THE HOUSING

(71) Applicant: KNORR-BREMSE Systeme fuer Nutzfahrzeuge GmbH, Munich (DE)

(72) Inventor: Gilles Hebrard, Caen (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 125 days.

(21) Appl. No.: 15/534,663

(22) PCT Filed: Dec. 9, 2015

(86) PCT No.: PCT/EP2015/079166
§ 371 (c)(1),
(2) Date: Jun. 9, 2017

(87) PCT Pub. No.: WO2016/091976
PCT Pub. Date: Jun. 16, 2016

(65) Prior Publication Data
US 2018/0266407 A1    Sep. 20, 2018

(30) Foreign Application Priority Data
Dec. 10, 2014 (DE) .................... 10 2014 118 269

(51) Int. Cl.
*F04B 39/06* (2006.01)
*F04B 53/16* (2006.01)
(Continued)

(52) U.S. Cl.
CPC ............ *F04B 39/064* (2013.01); *F02F 1/004* (2013.01); *F04B 53/168* (2013.01); *F16J 10/04* (2013.01);
(Continued)

(58) Field of Classification Search
CPC ....... F04B 39/064; F04B 53/168; F02F 1/004; F16J 10/04
See application file for complete search history.

(56) References Cited

U.S. PATENT DOCUMENTS 4,214,358 A      7/1980   Clerc
5,251,579 A  *  10/1993   Morris ................... F16J 10/04
                                                        123/195 R
(Continued)

FOREIGN PATENT DOCUMENTS

CH            84 799         4/1920
CN          1118409 A         3/1996
(Continued)

OTHER PUBLICATIONS

International Search Report (PCT/ISA/210) issued in PCT Application No. PCT/EP2015/079166 dated Feb. 19, 2016 with English translation (7 pages).
(Continued)

*Primary Examiner* — Michael Leslie
(74) *Attorney, Agent, or Firm* — Crowell & Moring LLP

(57) ABSTRACT

An arrangement has a housing, which has a receptacle or an opening, and a cylindrical insert, which is mounted in the receptacle or opening via at least one interference fit. The insert has a peripheral groove, and therefore the insert is both fastened against the housing and sealed against the housing in a liquid- and/or gas-tight manner by way of material of the insert and/or housing that has been pressed into the groove during the assembly. The material of the insert and/or of the housing is displaced in the case of an interference fit. The groove provides a defined location to which the material can preferably flow. After the assembly has been concluded, the insert is locked against the housing by the material located in the groove. At the same time, the
(Continued)

material acts as a seal between the insert and the housing. A separate seal in the region of the press fit becomes dispensable.

10 Claims, 3 Drawing Sheets

(51) Int. Cl.
*F02F 1/00* (2006.01)
*F16J 10/04* (2006.01)
*F28D 7/10* (2006.01)

(52) U.S. Cl.
CPC .......... *F28D 7/106* (2013.01); *F28F 2275/08* (2013.01); *F28F 2275/10* (2013.01); *F28F 2275/12* (2013.01)

(56) References Cited

U.S. PATENT DOCUMENTS

| | | | | |
|---|---|---|---|---|
| 5,333,668 | A * | 8/1994 | Jorstad | B22D 19/0009 164/100 |
| 5,537,969 | A | 7/1996 | Hata et al. | |
| 6,116,198 | A * | 9/2000 | Kirtley | F02F 1/163 123/193.3 |
| 6,799,541 | B1 * | 10/2004 | Clinton | F02F 1/16 123/41.84 |
| 8,844,478 | B2 * | 9/2014 | Roth | F16J 10/04 123/41.72 |
| 10,001,120 | B2 * | 6/2018 | Hoban | F04B 53/168 |
| 2012/0304954 | A1 * | 12/2012 | Kiser | F02F 1/004 123/193.2 |
| 2013/0180109 | A1 | 7/2013 | Hong et al. | |
| 2013/0228068 | A1 | 9/2013 | Stuehlinger et al. | |
| 2017/0218934 | A1 * | 8/2017 | Hebrard | F04B 39/064 |

FOREIGN PATENT DOCUMENTS

| | | |
|---|---|---|
| CN | 201162580 Y | 12/2008 |
| CN | 201574817 U | 9/2010 |
| CN | 103069149 A | 4/2013 |
| CN | 203414005 U | 1/2014 |
| CN | 203772090 U | 8/2014 |
| CN | 104100403 A | 10/2014 |
| CN | 204646447 U | 9/2015 |
| DE | 43 01 126 A1 | 7/1994 |
| DE | 44 07 978 A1 | 9/1995 |
| DE | 10 2009 023 332 A1 | 1/2011 |
| EP | 1 114 264 B1 | 7/2001 |
| EP | 2 258 972 A1 | 12/2010 |
| EP | 2 636 901 A1 | 9/2013 |
| JP | 53-119763 A | 10/1978 |
| JP | 56-150688 A | 11/1981 |
| JP | 63-125887 A | 5/1988 |
| JP | 2002-4939 A | 1/2002 |
| JP | 2009-156183 A | 7/2009 |
| JP | 2011-127537 A | 6/2011 |
| JP | 2011-127610 A | 6/2011 |
| WO | WO 96/28661 A1 | 9/1996 |
| WO | WO 2012/021709 A1 | 2/2012 |

OTHER PUBLICATIONS

German-language Written Opinion (PCT/ISA/237) issued in PCT Application No. PCT/EP2015/079166 dated Feb. 19, 2016 (5 pages).
English Translation of the Chinese First Office Action issued in Chinese counterpart application No. 201580066798.2 dated Jun. 21, 2018 (Eight (8) pages).
English Translation of the Chinese Second Office Action issued in Chinese counterpart application No. 201580066798.2 dated Apr. 2, 2019 (Seven (7) pages).
English-language Chinese Office Action issued in Chinese counterpart application No. 201580066798.2 dated Oct. 8, 2019 (Five (5) pages).
Indian Office Action issued in Indian counterpart application No. 201737018743 dated Oct. 4, 2019, with English translation (Five (5) pages).

* cited by examiner

HOUSING HAVING A CYLINDRICAL INSERT SEALED AGAINST THE HOUSING

BACKGROUND AND SUMMARY OF THE INVENTION

The invention relates to a sealed arrangement consisting of a housing and a cylindrical insert.

Crankcases for engines and compressors are frequently composed of light, soft materials, such as, for example, aluminum. These materials are unsuitable for the cylinder running faces along which the pistons slide. Cylinder liners composed of harder materials and along which the pistons slide during operation of the engine or compressor are therefore inserted into corresponding cylinder bores in the crankcase. The cylinder liners have to be sealed here in relation to the crankcase. This applies in particular whenever the cylinder liner encloses a cooling duct with the crankcase.

Cylinder liners are generally inserted into the crankcase either in a loose fit or in an interference fit. In the case of a loose fit, the cylinder liner can move within the crankcase during the subsequent operation, which impairs the tightness. In the case of an interference fit, the seal (O-ring) attached between cylinder liner and crankcase can be mechanically damaged, and this can no longer be checked after the cylinder liner is fitted into the crankcase.

It is therefore the object of the invention to provide an arrangement consisting of a housing and a cylindrical insert having improved sealing.

This object is achieved according to the invention by an arrangement according to the embodiments of the invention. Further advantageous refinements emerge are described and claimed herein.

Within the scope of the invention, an arrangement has been developed consisting of a housing with a receptacle or opening and a cylindrical insert which is fitted into the receptacle or opening with at least one interference fit. Cylindrical is understood as meaning not only circular cylinders. The cylinder may also have an elliptical or polygonal area.

According to the invention, the insert has an encircling groove, and therefore said insert is both fastened and sealed in a liquid and/or gas-tight manner against the housing by the material of the insert and/or the housing, which material has been pushed into the groove during the installation.

The cross section of the groove can have any desired shape. The simplest to manufacture are grooves with a rounded cross section, for example with a radius of curvature of between 0.5 and 1.5 mm. However, V grooves or other grooves with a polygonal cross section, such as, for example, rectangular grooves, are also permissible.

It has been recognized that basically material of the insert and/or of the housing is displaced during an interference fit. The groove provided according to the invention provides a defined location to which said material can preferably flow. After the installation is finished, the insert is firstly locked against the housing by the material located in the groove. Secondly, this material acts at the same time as a seal between the insert and the housing. A separate seal in the region of the interference fit is unnecessary.

The fitting of the insert into the housing can be implemented by forcibly pressing the insert into the receptacle or opening, by heating the housing and subsequently introducing the insert or by a combination of both measures.

The insert is advantageously a hollow cylinder with an open area and/or top surface. It is then suitable, for example, as a running face for a piston which is driven by a medium in the insert (cylinder liner) in an engine or conversely in a compressor which compresses the medium located in the cylinder liner. A hollow cylinder in principle has an outer wall.

The groove advantageously has a depth in the region of between 5% and 15% of the thickness of said outer wall. This is an optimum compromise between: (i) the stability of the fastening between the insert and the housing, said stability increasing as the depth of the groove increases; (ii) the quality of the seal between insert and housing, the quality tending to decrease above a certain depth; and (iii) the stability of the outer wall as such, the stability likewise having a tendency to decrease as the depth of the groove increases.

An outer wall of the insert and an inner wall of the housing advantageously surround a space in a liquid and/or gas-tight manner. A cooling medium, for example, can flow through such a space. Said space is substantially simpler to manufacture than a cooling space surrounded on all sides by the housing itself: if the housing is cast, a cooling space completely surrounded by the housing has to be kept free during casting by means of sand or similar means. It is difficult to fully remove said sand after the casting so that the sand does not enter the cooling circuit and, for example, damage a pump. Furthermore, the connections of such a cooling space through the wall of the housing to the outside and the closures thereof are susceptible to leakages. If, by contrast, a wall of the cooling space is formed by the insert, a corresponding clearance has to be drilled out as the sole additional manufacturing step at the housing.

This principle can be used not only in engines and compressors. A heat exchanger can also profit therefrom. In the case of a heat exchanger according to the invention, a liquid or gaseous medium can flow in each case both through the space between insert and housing and through the insert, and therefore heat can be exchanged between the two media through the wall of the insert. For example, a hot gas can flow through the insert, and a cooling medium can flow through the space between insert and housing. The improved seal according to the invention is substantially more stable in relation to changing temperatures than seals with O-rings according to the prior art.

The insert is advantageously manufactured from a harder material than the housing. The material of the housing is then preferably displaced when the insert is introduced into the housing. The material penetrates into the groove on the insert and engages behind said groove. Both the mechanical locking of the insert against the housing and the seal are then particularly good.

For example, the housing can be composed of aluminum, and the insert can be composed of cast iron, steel, a copper alloy or hyper-eutectoid aluminum. A crankcase, for example, can then be manufactured from lightweight aluminum without having to dispense with the advantages of the hard materials mentioned on the cylinder running face.

The groove advantageously has a width which is in the region of three to five times its depth. This is an optimum compromise between the stability of the mechanical locking between insert and housing, said stability having a tendency to become better as the width of the groove increases, and the quality of the seal, said quality having a tendency to become poorer above an optimum width.

For the same considerations, the groove preferably has a depth of between 0.4 mm and 1 mm, preferably between 0.4 mm and 0.8 mm.

In a particularly advantageous refinement of the invention, the housing is designed as a crankcase of an engine or compressor, and the insert is designed as a cylinder liner. This refinement solves the problems described at the beginning with the interference fit between cylinder liners and crankcases. According to the prior art, there is basically the problem that, in the case of an interference fit, the cylinder liner in some way channels a path into the housing material, with leakages arising because of the mutual deformation. The groove which is provided according to the invention provides a defined location to which the displaced material migrates. By this clearance being arranged on the insert, the material of the housing is preferably also displaced. The better mechanical locking leads to the cylinder liner no longer moving within the crankcase in operation. During the subsequent operation, the previously known misalignment of the cylinder center axis in relation to the axis of the crankshaft no longer occurs either. The two axes remain exactly in one plane. The clearance in the form of the groove leads to the displacement of material of the housing no longer, as previously, resulting in deformation of the cylinder bore.

By means of the improved mechanical locking between cylinder liner and housing, it is furthermore ensured that, after installation of the cylinder liner, the housing can still be mechanically machined to the full extent without destroying the alignment of the cylinder liner in relation to the cylinder bore in the housing. It is therefore no longer necessary to have completed all of the mechanical machining steps on the housing before the cylinder liner is finally fitted. In particular, during the mechanical machining, steps between the upper end of the cylinder liner and the upper top surface of the housing can be eliminated. The mechanical machining of the crankcase is required, for example, in order to form bearings for the crankshaft, flanges or the upper top surface of the housing. Furthermore, the cylinder liner itself can advantageously also be further processed after installation in the crankcase has taken place in order to optimize the cooperation of the cylinder liner with the piston during the subsequent operation. If a cooling space is not provided between housing and cylinder liner, the improved seal according to the invention continues still to be of advantage: it then protects the connection between cylinder liner and housing against undesired escape of oil.

Not all contact points between the insert (cylinder liner) have to be designed as interference fits. The interference fit provided according to the invention may also be combined with other types of fit.

The seal by the material penetrating into the groove can be improved further by introduction of a liquid seal.

BRIEF DESCRIPTION OF THE DRAWINGS

The subject matter of the invention is explained below with reference to figures without thereby restricting the subject matter of the invention.

DETAILED DESCRIPTION OF THE DRAWINGS

Figure 1A:
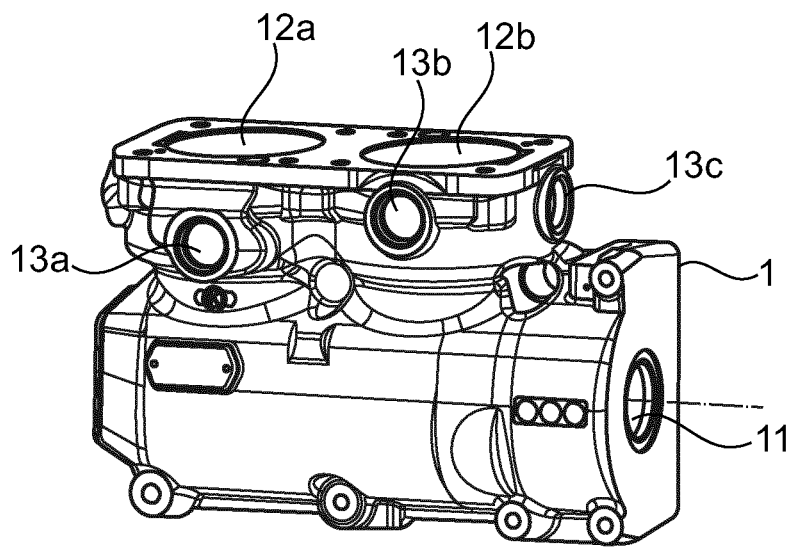
FIGS. 1A and 1B show a cast iron crankcase for a compressor with cooling ducts according to the prior art in an external and sectional view, respectively.

FIG. 1A shows the external view of a compressor housing according to the prior art with integrated cooling ducts. Said crankcase 1 is manufactured from cast iron. It has a crank space 11 and two cylinder bores 12a and 12b. In the region of the cylinder bores 12a and 12b, openings 13a, 13b and 13c in the outer wall of the housing lead to the cooling ducts which are integrated in the housing.

Figure 1B:
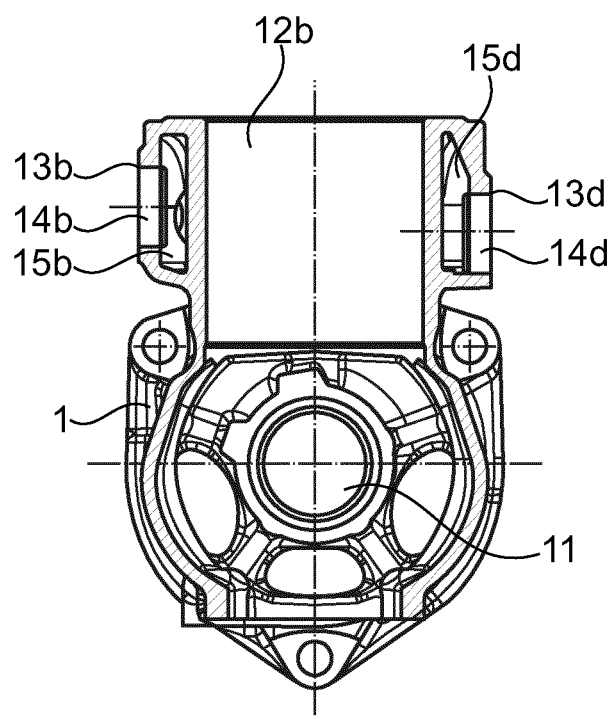

FIG. 1B is a sectional drawing of the crankcase shown in FIG. 1A perpendicular to the axis of the crank space 11. The intersecting plane centrally divides the cylinder bore 12b. In this view, the openings 13b and 13d in the wall of the crankcase, said openings leading to the cooling ducts 15b and 15d, are closed with stoppers 14b and 14d. The cylinder liner necessary for the operation is not yet fitted in this view.

In order to be able to cast the cooling ducts 15b and 15d, a corresponding casting mold composed of sand is necessary. After the manufacturing, precise care should be taken to ensure that the sand is completely removed from the cooling ducts 15b and 15d since the sand can otherwise penetrate into the engine and possibly damage the water pump. Furthermore, the closure of the openings 13b and 13d by the stoppers 14b and 14d is a weak point in respect of the sealing which frequently necessitates an additional liquid seal. Furthermore, it is not possible to change the material of the crankcase 1 to aluminum cast under high pressure because it is not possible in this case to manufacture the cooling ducts 15b and 15d. Alternative designs may solve most of these problems, but only in exchange for other problems: in many cases, a step arises between the upper end of the cylinder liner and the upper top surface of the housing 1, said step impairing the sealing of the cylinder heads in relation to said top surface.

A cylinder liner can be inserted into the cylinder space 12b in two different ways: either with a loose fit or with an interference fit. The loose fit has the disadvantage that the cylinder liner may move within the cylinder bore 12b during the subsequent operation because of thermal expansion or because of mechanical stressing. In the case of the interference fit, the O-ring which seals the cylinder liner in relation to the cylinder bore 12b may be damaged by the mechanical action of force during the assembly, and this can no longer be checked after the assembly.

Figure 2:
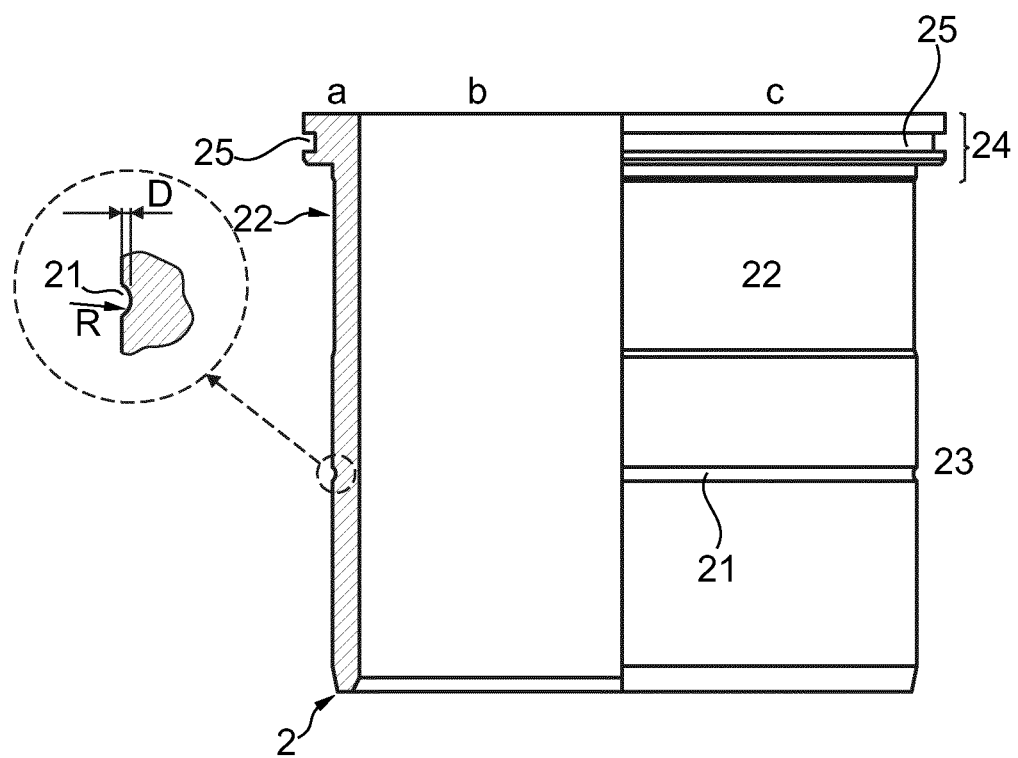
FIG. 2: shows a cylinder liner as an insert according to an exemplary embodiment of the invention.

FIG. 2 shows a cylinder liner which is provided as an insert in an exemplary embodiment of the invention. The region a illustrates a cross section through the wall of the cylinder liner. Region b shows a profile drawing of the inner wall. Region c shows a profile drawing of the outer wall.

The outer wall of the cylinder liner 2 has a groove 21 which is illustrated in enlarged form. It has a rounded cross section with a radius R of 1 mm and a depth D of 0.5 mm. During the subsequent insertion of the cylinder liner into the cylinder bore by means of an interference fit, material is displaced from the wall of the cylinder bore into said groove 21 and engages behind the latter. As a result, the cylinder liner 2 is firstly mechanically locked in the crankcase 1. Secondly, it is sealed in relation to the inner wall of the cylinder bore 12a, 12b. The region in which the cylinder liner will bear with an interference fit against the cylinder bore is denoted by the sign 23.

The exemplary embodiment shown in FIG. 2 uses the improved sealing between the cylinder liner and the inner wall of the cylinder bore in order to simplify and to improve the cooling of the cylinder liner. For this purpose, the outer wall of the cylinder liner has a recess 22 which, in conjunction with a corresponding recess on the inner wall of the cylinder bore 12*a*, 12*b*, will form a cooling duct. Below said cooling duct, the cylinder liner is sealed in relation to the inner wall of the cylinder bore by the interference fit with the groove 21. Above the cooling duct, the cylinder liner bears with the region 24 against the inner wall of the cylinder bore. In this region, a further groove 25 is provided into which a conventional O-ring is inserted to provide a seal in relation to the inner wall of the cylinder bore 12*a*, 12*b*. Since the cylinder liner is already mechanically locked in region 23 in relation to the cylinder bore 12*a*, 12*b* by the interference fit, a further interference fit is no longer necessary in region 24. The forces acting in region 24 are therefore not of such a size that, when the cylinder liner is inserted into the crankcase, an O-ring inserted into the groove 25 is mechanically damaged.

After the casting, the crankcase is advantageously initially provided only with the cylinder bores 12*a* and 12*b* and is machined further only after the cylinder liner 2 is inserted. The insertion of the cylinder liner 2 can be carried out by mechanical application of force, by heating the crankcase or by a combination of the two measures.

Figure 3:
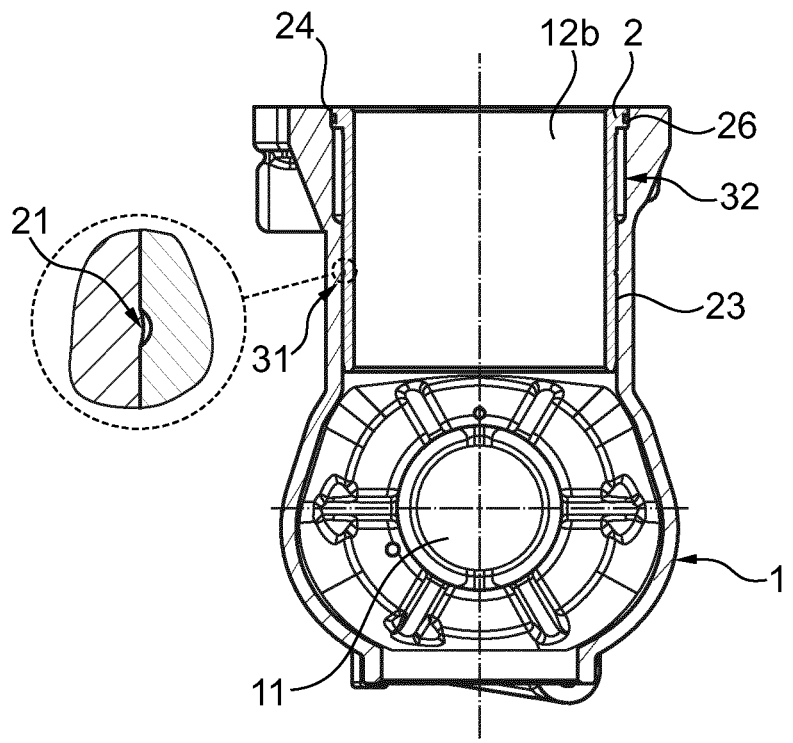
FIG. 3: shows a crankcase of a compressor with a cylinder liner as an insert as an arrangement according to an exemplary embodiment of the invention.

FIG. 3 shows an exemplary embodiment of a crankcase for a compressor within the meaning of the invention. FIG. 3 is a sectional drawing through the same plane as in FIG. 1B. The crankcase 1 is composed of aluminum cast under high pressure. A cylinder liner 2 according to FIG. 2 is inserted into the cylinder bore 12*b* of said crankcase. The recess 22 of the cylinder liner, which recess is illustrated in FIG. 2, corresponds to a recess 32 in the inner wall of the cylinder bore 12 in order to form a cooling duct for liquid cooling of the cylinder liner 2. The recess 32 can be produced, for example, by the cylinder bore 12*b* being expanded in its upper region by a further bore with a somewhat larger diameter. The cooling duct 32 is sealed downward by the region 23 in which the cylinder liner bears against the inner wall of the cylinder bore 12*b* by means of an interference fit. The central sealing element here is the groove 21, which is arranged in the region 31, in the outer wall of the cylinder liner. As is illustrated in a detail enlargement, the wall material of the cylinder bore 12*b* has been pushed by the mechanical application of force into the groove 21 and engages behind the latter. As a result, the cylinder liner 2 is mechanically locked and at the same time sealed within the cylinder bore 12*b*. Above the cooling duct 32, the cylinder liner 2 is fitted with its region 24 loosely into the inner wall of the cylinder bore 12*b*. The sealing takes place here by means of a conventional O-ring 26 which is fitted in the further groove 25 in the region 24 in the outer wall of the cylinder liner.

This crankcase affords a plurality of advantages over the prior art: firstly, it is significantly lighter than the cast iron crankcase because it is manufactured from aluminum. The omission of the necessity of having to manufacture cooling ducts 15*b* and 15*d* which are completely surrounded by the material of the crankcase has enabled the change from cast iron to the lighter aluminum. The function of the cooling ducts 15*b* and 15*d* is replaced by the cooling duct 32 which corresponds to the corresponding recess 22 on the outer wall of the cylinder liner. An additional saving in weight is produced by the fact that no additional material has to be used at all for forming the cooling duct; on the contrary, material is in each case taken only from components which are already present in any case. The crankcase 1 with the fixedly locked cylinder liner 2 can be treated for further mechanical machining as though crankcase 1 and cylinder liner 2 were composed of a cast part. Bearings for the crankshaft, flanges and cylinder heads can be fitted without the cylinder liner 2 being displaced once again within the cylinder bore 12*b*. The cylinder liner 2 itself can also still be mechanically machined, for example by drilling or honing, without it being displaced in the cylinder bore 12*b*. During each mechanical machining process, the seal is also completely maintained in the region 31 by means of the groove 21 and the material which has penetrated into the latter.

The advantages of the improved sealing between cylinder liner 2 and cylinder bore 12*b* can be used even if the crankcase 1 is not water-cooled. The seal 31 then provides protection against oil escaping from the crank space 11.

Figure 4:
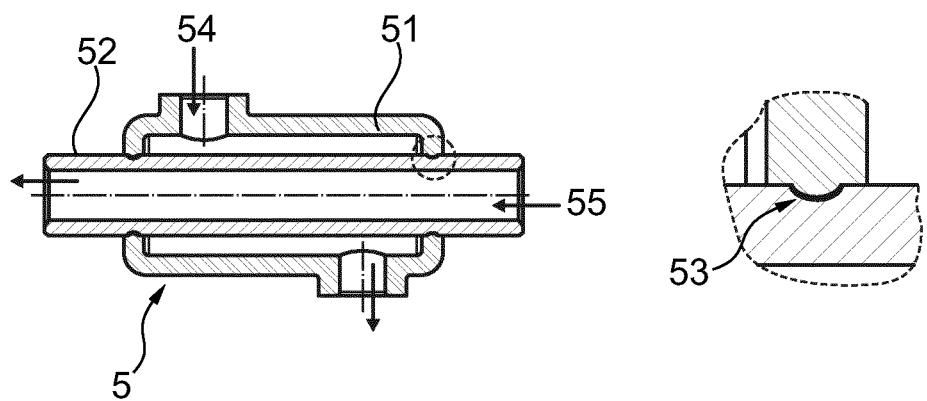
FIG. 4: shows a heat exchanger with cooled housing and insert through which hot gas flows as an arrangement according to a further exemplary embodiment of the invention.

FIG. 4 shows a heat exchanger as a further exemplary embodiment of an arrangement according to the invention. It comprises an aluminum housing 51 through which a liquid cooling medium 54 can flow, and a cylindrical pipe 52 which is inserted in said housing 51 and is composed of a harder material through which a hotter medium, in particular a hot gas, can flow. The hard material for the pipe 52 can be, for example, cast iron, steel or a copper alloy. The outer wall of the pipe 52 has an encircling groove 53 at each of the contact points with respect to the housing 51. The pipe 52 is in each case inserted into the housing 51 with an interference fit. As clarified in the detail enlargement, during the mechanical fitting together, the softer material of the housing 51 has penetrated into the groove 53 on the pipe 52 and engages behind said groove. This effect can, in a catchy way, also be called "spring back effect". The improvement of the interference fit by means of the groove provided according to the invention improves both the mechanical locking of the pipe 52 in relation to the housing 51 and also in particular the sealing of the hot medium 55 in relation to the cooling liquid 54. This seal is particularly greatly stressed on a heat exchanger because of the high temperature differences and constant change in temperature.

The invention claimed is:
1. An arrangement, comprising:
a housing with a first bore; and
a cylindrical insert, which is fitted with an interference fit into the first bore, wherein
the insert has an encircling groove,
the insert is both fastened and sealed in a liquid and/or gas-tight manner against the housing by the material of the insert and/or of the housing, which material has been pushed into the groove during the interference fit,
an outer wall of the insert and an inner wall of the housing surround a space in a liquid and/or gas-tight manner, which space is sealed below by a first region with the interference fit, wherein a central sealing element in the first region is the groove which seals by the material that has been pushed into the groove during the interference fit, and is sealed above by an O-ring,
the cylindrical insert has a second region, wherein the second region is sealed with respect to the inner wall of the housing by the O-ring and wherein the second region is fitted loosely into the inner wall of the housing without an interference fit, and
the space is formed by the first bore of the housing being expanded in an upper region of the first bore by a second bore of the housing wherein the second bore has a larger diameter than the first bore.
2. The arrangement as claimed in claim 1, wherein the insert is a hollow cylinder with an open area and/or top surface.
3. The arrangement as claimed in claim 2, wherein the groove has a depth in a range of between 5% and 15% of a thickness of the outer wall of the insert.

4. The arrangement as claimed in claim 3, wherein the housing is composed of aluminum, and the insert is composed of cast iron, steel, a copper alloy or hyper-eutectoid aluminum.

5. The arrangement as claimed in claim 1, wherein the insert is manufactured from a harder material than the housing.

6. The arrangement as claimed in claim 5, wherein the housing is composed of aluminum, and the insert is composed of cast iron, steel, a copper alloy or hyper-eutectoid aluminum.

7. The arrangement as claimed in claim 1, wherein the groove has a width in a range of three to five times its depth.

8. The arrangement as claimed in claim 1, wherein the groove is between 0.4 mm and 1 mm deep.

9. The arrangement as claimed in claim 1, wherein the groove is between 0.4 mm and 0.8 mm deep.

10. The arrangement as claimed in claim 1, wherein the housing is a crankcase of an engine or compressor, and the insert is a cylinder liner.

* * * * *